United States Patent [19]

Kühn et al.

[11] Patent Number: 5,117,966
[45] Date of Patent: Jun. 2, 1992

[54] CONVEYOR SYSTEM

[75] Inventors: Werner Kühn; Karl-Wilhelm Stoltenhoff, both of Wetter, Fed. Rep. of Germany

[73] Assignee: Mannesmann Aktiengesellschaft, Düsseldorf, Fed. Rep. of Germany

[21] Appl. No.: 572,002

[22] Filed: Aug. 23, 1990

[30] Foreign Application Priority Data

Aug. 24, 1989 [DE] Fed. Rep. of Germany ....... 3928437

[51] Int. Cl.$^5$ .............................................. B65G 37/00
[52] U.S. Cl. ............................... 198/468.1; 198/465.1; 198/465.2
[58] Field of Search ................ 198/465.1, 465.2, 468.1

[56] References Cited

U.S. PATENT DOCUMENTS

| | | | |
|---|---|---|---|
| 3,802,588 | 4/1974 | Lutz | 198/465.2 |
| 3,877,386 | 4/1975 | Wakabayashi | 198/465.1 |
| 4,116,324 | 9/1978 | Burmeister | 198/465.1 |
| 4,147,250 | 4/1979 | Schulz | 198/465.2 |
| 4,454,939 | 6/1984 | Kampf et al. | 198/465.2 |

FOREIGN PATENT DOCUMENTS

| | | |
|---|---|---|
| 2327201 | 12/1973 | Fed. Rep. of Germany . |
| 2308976 | 9/1974 | Fed. Rep. of Germany . |
| 2355143C3 | 2/1981 | Fed. Rep. of Germany . |
| 2839330C2 | 10/1983 | Fed. Rep. of Germany . |
| 3232764C2 | 3/1985 | Fed. Rep. of Germany . |
| 3737086A1 | 5/1988 | Fed. Rep. of Germany . |
| 1205599 | 2/1960 | France ............................ 198/468.1 |
| 1352358 | 1/1964 | France . |
| 875681 | 8/1961 | United Kingdom . |

OTHER PUBLICATIONS

Horst Buchta, Ball-type Conveyors, Dec. 1974, 498-500.

*Primary Examiner*—Joseph E. Valenza
*Attorney, Agent, or Firm*—Horst M. Kasper

[57] ABSTRACT

A conveyor system is disclosed with a first and a second conveyor track disposed at the same height level and together forming angles of at least 45 degrees relative to and crossing each other. The first and the second conveyor tracks are formed of crossing bars furnishing support rails with smooth surface providing sliding contact rails. Loading devices furnished with a flat floor are moved on the conveyor track. Engagement dogs convey said loading devices while protruding beyond the surface of the conveyor tracks and are attached to a driver in the form of an endless circulating chain. A deflection pulley and a drive wheel driven by a motor guides the endless circulating chain which is supported by guiding rail supports.

24 Claims, 2 Drawing Sheets

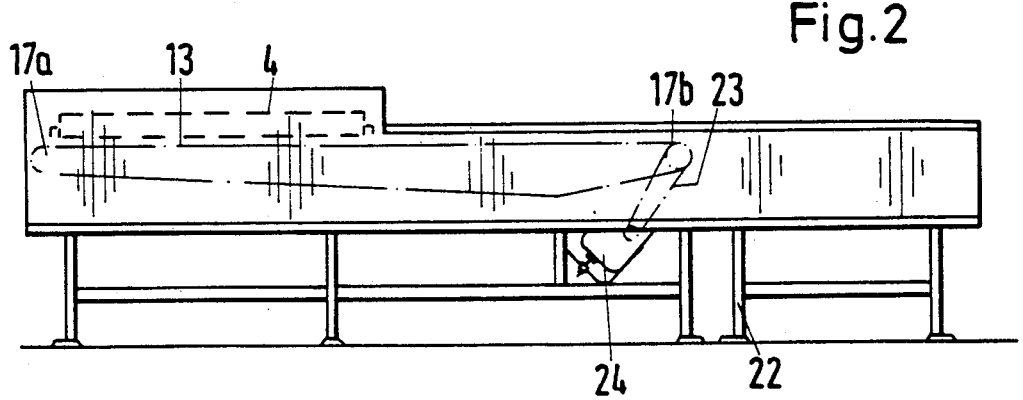
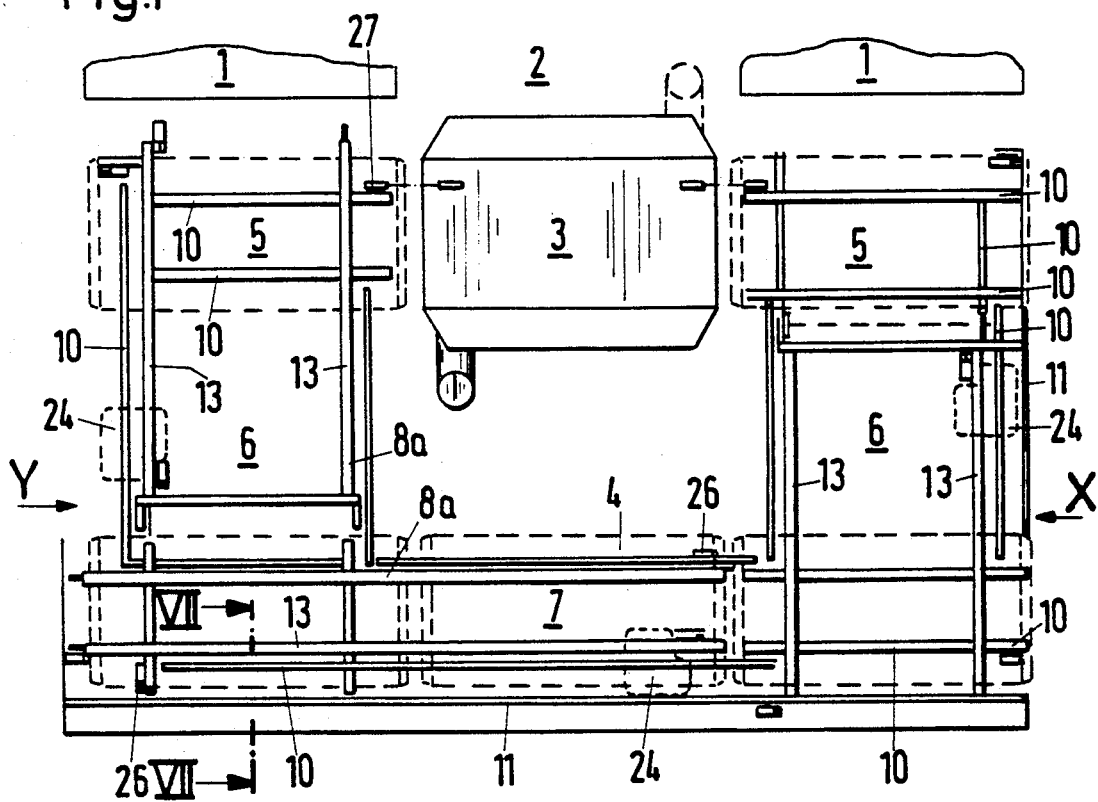
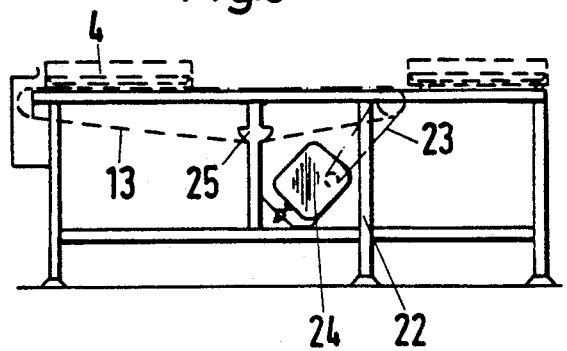

CONVEYOR SYSTEM

BACKGROUND OF THE INVENTION

1. Field of the Invention

The invention relates to a transport system with a conveyor track disposed on the same height level and penetrating each other in different directions for a load support means for materials to be conveyed which are driven by engaging dogs protruding above the surfaces of the conveying track.

2. Brief Description of the Background of the Invention Including Prior Art

Such a conveying system is known from the German patent DE-PS 32 32 764 and is furnished at the corner points for the different transport direction with lift and lowering means, where the pallets are transferred from one conveyor to a second conveyor. Such lift and lowering means make obviously sense for heavy load materials and they are also required for such materials, however in case of a lighter load support means, they are not required, for example where in production of up to about 500 kilograms have to be transported.

SUMMARY OF THE INVENTION

1. Purposes of the Invention

It is an object of the invention to furnish a conveyor system such that the transfer from one conveyor to a second conveyor is possible with lowest equipment requirement.

It is a further object of the present invention to simplify redirection of loads which are carried by a transport system.

It is yet another object of the invention to provide a secure support for the loads to be transported.

These and other objects and advantages of the present invention will become evident from the description which follows.

2. Brief Description of the Invention

The invention discloses a conveyor system with a first conveyor track and a second conveyor track. The conveyor tracks are disposed at the same height level and form angles of at least 45 degrees relative to each other and cross each other. Load auxiliary means for material are furnished with a flat floor. Engagement dogs are used for conveying and driving and moving said load auxiliary means. The engagement dogs protrude beyond the upper surface of the first conveyor track and of the second conveyor track. The first conveyor track and the second conveyor track are formed of crossing bars furnishing support rails with smooth surface providing sliding contact rails. Driving means is connected to the engagement dogs and moving the engagement dogs.

The first conveyor track and the second conveyor track can include sliding pieces disposed along a row for forming a sliding contact rail. Two sliding contact rails are present in the neighborhood of the load auxiliary means for the first conveyor track and for the second conveyor track. The engagement dogs are disposed next to the respective sliding contact rail for moving in a direction substantially parallel to the sliding contact rail. Guide rails are disposed next to the outer sliding contact rails of the conveyor system.

An endless circulating chain having a carrying run is furnished for each engagement dog. Each engagement dog is attached to the respective endless circulating chain. A deflection pulley is guiding the endless circulating chain. A drive wheel guides and drives the endless circulating chain. A motor drives the drive wheel. A support rail advantageously is supporting and guiding the carrying run of the endless circulating chain. The engagement dog can be attached to a member of the endless circulating chain. A finger can be protruding from the engagement dog and is generally disposed below the load auxiliary means. A back plate is attached in front of the engagement dog such that the back plate supports the engagement dog on the sequentially neighboring chain members.

A bearing block can be supported on a frame. A bearing can be attached to the bearing block. A shaft is attached to the drive wheel and the shaft is supported via the bearing. A drive chain connects the drive wheel to the motor. The deflection pulley can be disposed on a second shaft, near the start of the conveyor track ahead of the edge of the load auxiliary means by a distance corresponding to the extension of the engagement dog perpendicular to hinges of the drive chain and to the length of the backplate. The deflection pulley is preferably disposed at the end of the conveyor track by the circular arc measure of the engagement dog around the rotation axis of the shaft up to the lower edge of the load auxiliary means ahead of the end deflection place. A proximity switch is coordinated to an individually possible stop position of the first conveyor track. A lift table is desirably disposed at an intersection of the first conveyor track with another conveyor track. A light barrier is advantageously disposed between the lift table of rack-operating device and the conveyor transport system.

According to the invention the conveyor tracks are furnished of walls made of furnishing support rails and crossing each other and having smooth surfaces for sliding contact. The load of auxiliary means have also a flat floor. The load auxiliary means can be furnished by a flat sheet of the kind employed as baking sheets or baking tins. The load auxiliary means can be shifted and slid without problem over the sliding contact surfaces disposed on the same height level, where the engaging dogs can engage at the rear and of the load of auxiliary means.

Preferably each conveyor track is furnished of two piece sequence forming or, respectively continuous sliding rail forming a track disposed in the near neighborhood of the edge of the load the auxiliary means and is furnished with an outer guide rail as well as two engaging dogs disposed on the side of the sliding contact rails, which engaging dogs are attached at the circulating endless chains and which are guided by deflection pulleys, which are driven by a motor and which are guided in the carrying run on a support rail.

According to a further embodiment of the invention the engaging dog attached at one member of the chain is furnished with a finger protruding under the load auxiliary means and protruding in transport forward direction as well as a back plate by way of which the engaging dog is supporting itself on the next sequentially following chain member. The deflection wheel, present at the starting point of the haulage way, is disposed in front of the edge of the load auxiliary means by the length of the engaging dog and the back plate. The deflection wheel at the end of the conveyor track is disposed by the circular arc measure of the engagement dog around the rotation axis of the shaft up to the lower edge of the load auxiliary means ahead of the end and deflection position of the load auxiliary means in order that the load auxiliary means can not be shifted further than a predetermined location, which is limited by a guide rail. A proximity switch disposed in the region of the stand place controls the motor and prevents that load auxiliary means is shifted onto this occupied transport conveyor place. A light barrier between one lift table of rack operating device and the conveyor system prevents an overfilling of the conveyor system.

The novel features which are considered as characteristic for the invention are set forth in the appended claims. The invention itself, however, both as to its construction and its method of operation, together with additional objects and advantages thereof, will be best understood from the following description of specific embodiment when read in connection with the accompanying drawing.

BRIEF DESCRIPTION OF THE DRAWING

In the accompanying drawing, in which are shown several of the various possible embodiments of the present invention:

FIG. 1 is a top plane view of the conveyor system,

FIG. 2 is a side elevational view of the embodiment illustrated in FIG. 1,

FIG. 3 is a front elevational view of the conveyor system as seen out of the direction X, FIG. 4 is a partial front elevational view of the transport system as seen from the direction Y.

DESCRIPTION OF INVENTION AND PREFERRED EMBODIMENT

Figure 5:
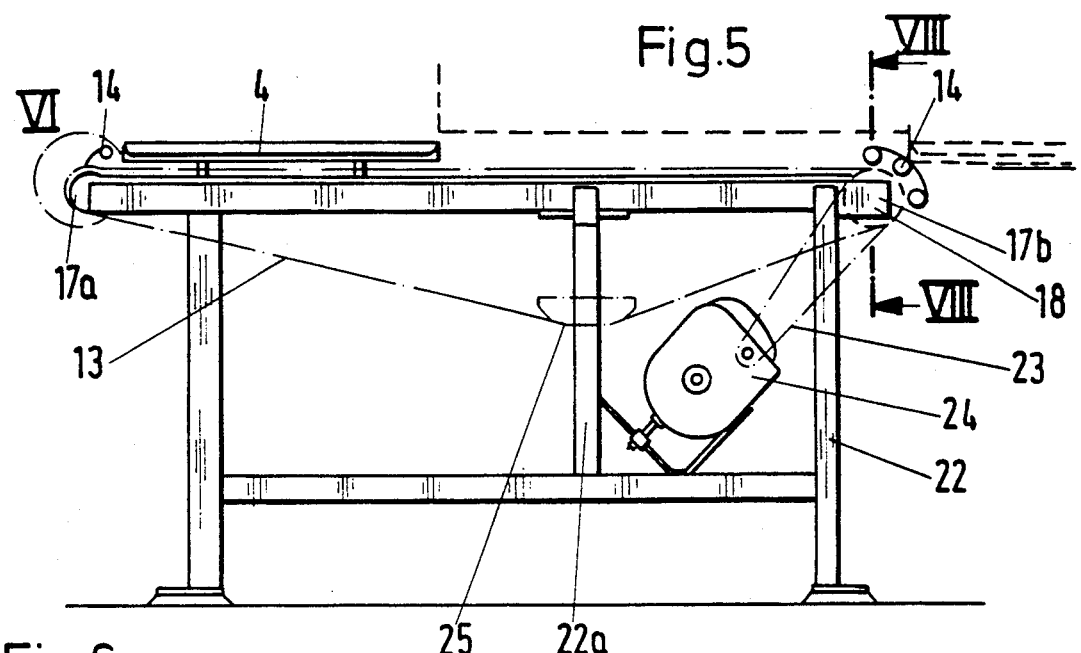
FIG. 5 is a side elevational view of the conveyor system of the FIG. 3.
Figure 6:
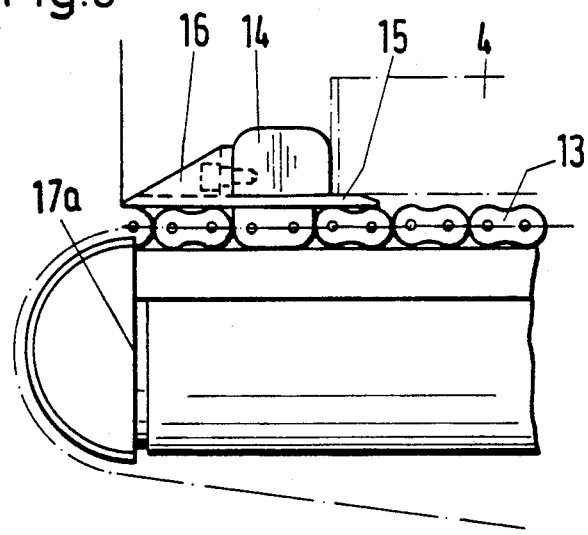
FIG. 6 is a detail view of the detail VI of FIG. 5 at an enlarged scale.
Figure 8:
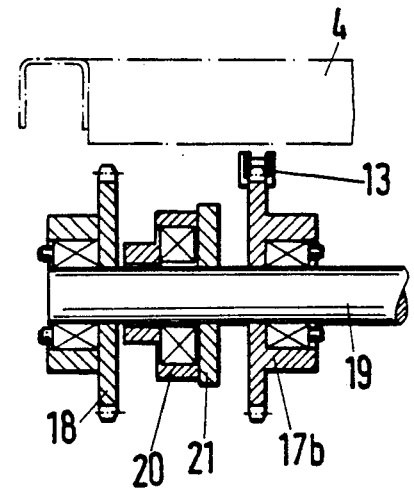
FIG. 8 is a sectional view along section lines VIII—VIII of FIG. 5 at an enlarged scale.

In accordance with the invention a conveyor system with conveyor tracks is disposed at a single height level and penetrating and running in different directions for a load auxiliary means for material to be conveyed and driven and moved by load auxiliary means 4. The load auxiliary means 4 are driven and protrude beyond the surface of the conveyor track. The conveyor tracks are formed of crossing bars furnishing support rails 8 with smooth surface providing sliding contact 10. The load auxiliary means 4 are furnished with a flat floor.

The sliding pieces of a row form a sliding contact rail 10. Two leading contact rails 10 are present in the neighborhood of the load auxiliary means 4 for each conveyor track (cross conveyor 6, longitudinal conveyor 7). The engaging dogs 14 are preferably disposed next to the sliding contact rail 10. Guide rails 11 are disposed next to the outer sliding contact rails 10 of the conveyor system.

Each engagement dog 14 is attached to an endless circulating chain 13. The endless circulating chain 13 is guided by deflection pulley 17. The deflection pulley is driven by a motor 24. The endless circulating chain 13 is guided in the carrying run, which carrying run carries on a support rail 12. The engaging dog 14 is attached to a member of the chain 13 and engages with finger 15 to be disposed below the load auxiliary means 4. The load auxiliary means is supported with a back plate 16 on the sequentially following chain members. One of the deflection wheels 17b and drive wheel 18 is attached to a shaft 19. The shaft 19 is supported via the bearing 20 and via bearing blocks 21 to a frame part 22. A drive chain 21 leads from the drive wheel 18 to the motor 24.

The deflection pulley 17 is disposed at the start of the conveyor track ahead of the edge of the load auxiliary means by the amount of the engagement dog 14 and of the backplate 16. The deflection pulley 17b is disposed at the end of the conveyor track by the circular arc measure of the engagement dog 14 around the rotation axis of the shaft 19 up to the lower edge of the load auxiliary means 4 ahead of the end deflection place. Proximity switches 26 are coordinated to the individually possible stop positions of the conveyor tracks. Light barriers 27 are present between one lift table 3 of rack-operating device 2 and the transport system.

An automatic control operating device 2 is movably disposed between two racks 1. The automatic operating device 2 can be driven with its elevating platform 3 for load auxiliary means 4 between 2 commissioner places 5 present at the front side of the rack 1. These commissioner places 5 are connected to each other via two cross conveyors 6 and a longitudinal conveyor 7. The conveyors are furnished with two support rails 8 with retaining strips 9 for sliding contact rail 10 or, respectively sliding contact pieces, where the surfaces are all disposed at the same height level such as the auxiliary charging means or load auxiliary means 4 do not have to be lifted or, respectively lowered by transfer from one conveyor to another conveyor. Right rails 11 for the load auxiliary means 4 are present next to the sliding contact rails 10, where the auxiliary charging means 4 are slid on endless chains 13, furnished with engaging dogs and guided on support rails 12. The endless chains 13 are disposed next to the support rails 8 on lower level positioned support rails 8a.

Each engaging dog 14 protrudes with a finger 15 to below the load auxiliary means 4 and supports itself with a backplate 16 on the chain 13, which chain 13 is guided around deflection wheel 17a and 17b. The tilting path of the engaging dog 14 is illustrated in FIG. 5 in the area of the deflection wheel 17b. The deflection wheel 17b is disposed, fixed against relative rotation together with the drive wheel 18 on a shaft 19. The shaft 19 is supported by a bearing 21 and a bearing block 21 at a rack part 22 of the conveyor system. Drive chain 23 is connected to a motor 24 from the drive wheel 18. A chain tensioning device 25 for the chain 13 is adjustably disposed at the rack part 22 as illustrated in FIG. 5. Proximity switches 26 can be furnished at desired location on the transport way of the auxiliary charging means or load auxiliary means 4 or, respectively at their end-station for stopping of the auxiliary charging means at the desired location. An overfilling of the conveyor system is prevented by a light barrier 27, which is disposed between the lifting table 3 and the commissioner places 5.

Figure 7:
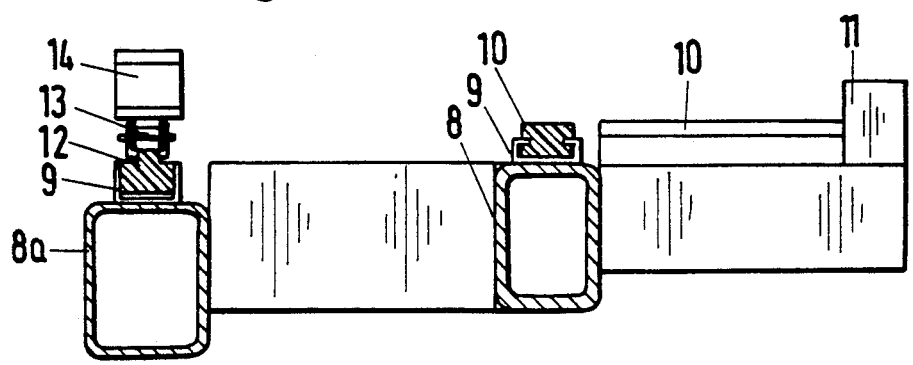
FIG. 7 is a sectional view along section lines VII—VII of FIG. 3.

The retaining strips 9 can be formed like rails where the side end of the retaining strips are engaging sliding contact rails 10 at respective opposite sides in horizontal direction (FIG. 7, center). The sliding contact rails 10 can have recesses for engagement of the retaining strips 9. The retaining strips 9 can be mounted on top of the support rails 8.

Alternatively, the retaining strips 9 can have a U-shaped cross section such that the upper u ends reach up to about the level of the bulk cross-section of the support rails 12 (FIG. 7, left). The contact point between the engaging dog 14 and the load auxiliary means 4 is preferable disposed on that half of the neighboring chain member which is disposed next to the chain member supporting the engaging dog. The height level of engagement of the engaging dog 14 is preferably between 2⅓ and ⅔ of the total height of the load auxiliary means 4 facing the engaging dog.

It will be understood that each of the elements described above, or two or more together, may also find a useful application in other types of material transport system configurations and load carrying procedures differing from the types described above.

While the invention has been illustrated and described as embodied in the context of a conveyor system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A conveyor system comprising a first conveyor track;
    a second conveyor track disposed at the same height level as the first conveyor track and forming angles of at least 45 degrees with the first conveyor track and crossing the first conveyor track;
    a load auxiliary means for material and which load auxiliary means are furnished with a flat floor;
    engagement dogs for conveying and driving and moving said load auxiliary means, which engagement dogs protrude beyond the surface of the first conveyor track and of the second conveyor track, wherein the first conveyor track and the second conveyor track are formed of crossing bars furnishing support rails with smooth surface providing sliding contact rails;
    driving means connected to the engagement dogs and moving the engagement dogs;
    an endless circulating chain having a carrying run for each engagement dog, wherein each engagement dog is attached to the respective endless circulating chain;
    deflection pulley guiding the endless circulating chain;
    a drive wheel guiding and driving the endless circulating chain;
    a motor driving the drive wheel;
    a support rail supporting and guiding the carrying run of the endless circulating chain;
    a finger protruding from the engagement dog and to be disposed below the load auxiliary means; and
    a back plate attached in front of the engagement dog such that the back plate supports the engagement dog on the sequentially neighboring chain members.

2. The conveyor system according to claim 1 wherein the first conveyor track and the second conveyor track include sliding pieces disposed along a row for forming a sliding contact rail.

3. The conveyor system according to claim 2 wherein two sliding contact rails are present in the neighborhood of the load auxiliary means for the first conveyor track and for the second conveyor track and wherein the engagement dogs are disposed next to the respective sliding contact rail for moving in a direction substantially parallel to the sliding contact rail.

4. The conveyor system according to claim 1 further comprising
    guide rails disposed next to the outer sliding contact rails of the conveyor system.

5. The conveyor system according to claim 1 further comprising
    a frame part;
    a bearing block supported on the frame;
    a bearing attached to the bearing block;
    a shaft, wherein the drive wheel is attached to the shaft and wherein the shaft is supported via the bearing; a drive chain connecting the drive wheel to the motor.

6. The conveyor system according to claim 5 further comprising
    a second shaft wherein the deflection pulley is disposed on the second shaft and at the start of the conveyor track ahead of the edge of the load auxiliary means by a distance corresponding to the extension of the engagement dog perpendicular to hinges of the drive chain and to the length of the backplate and wherein the deflection pulley is disposed at the end of the conveyor track by the circular arc measure of the engagement dog around the rotation axis of the shaft up to the lower edge of the load auxiliary means ahead of the end deflection place.

7. The conveyor system according to claim 1 further comprising
    a proximity switch coordinated to an individually possible stop position of the first conveyor track.

8. The conveyor system according to claim 1 further comprising
    a light barrier disposed between a lift table of a rack-operating device and the conveyor transport system.

9. A conveyor system with conveyor tracks disposed at the same height level and penetrating and running in different directions for a load auxiliary means for material to be conveyed and driven and moved by engagement dogs, which engagement dogs are driven and which protrude beyond the surface of the conveyor tracks, wherein the conveyor tracks are formed of crossing bars furnishing support rails (8) with smooth surface providing sliding contact (10) and wherein the load auxiliary means (4) are furnished with a flat floor,
    wherein two leading contact rails (10) are present in the neighborhood of the load auxiliary means (4) for each conveyor track (cross conveyor (6), longitudinal conveyor (7)), and wherein the engaging dogs (14) are disposed next to the sliding contact rail (10),
    wherein each engagement dog (14) is attached to an endless circulating chain (13), which endless circulating chain (13) is guided by deflection pulley (17) and which is driven by a motor (24) and which is guided in the carrying run, which carrying run carries on a support rail (12),
    wherein the engaging dog (14) is attached to a member of the chain (13) and engages with finger (15) protruding in transport direction disposed below the load auxiliary means (4) and which is supported with a back plate (16) on the sequentially following chain members.

10. The conveyor system according to claim 9 wherein the sliding pieces of a row form a sliding contact rail (10).

11. The conveyor system according to claim 9 wherein guide rails (11) are disposed next to the outer sliding contact rails (10) of the conveyor system.

12. The conveyor system according to claim 9 wherein
the deflection pulley (17) is disposed at the start of the conveyor track ahead of the edge of the load auxiliary means by the amount of the engagement dog (14) and of the backplate (16) and wherein a deflection pulley (17b) is disposed at the end of the conveyor track by the circular arc measure of the engagement dog (14) around the rotation axis of a shaft (19) up to the lower edge of the load auxiliary means (4) ahead of the end deflection place.

13. The conveyor system according to claim 12 wherein one of the deflection wheels (17b) and drive wheel (18), are attached to the shaft (19), which is supported via the bearing (20) and via bearing blocks (21) to a frame part (22) and wherein a drive chain (21) leads from the drive wheel (18) to the motor (24).

14. The conveyor system according to claim 9 wherein proximity switches (26) are coordinated to the individually possible stop positions of the conveyor tracks.

15. Conveyor system according to claim 9 wherein light barriers (27) are present between one lift table (3) of rack-operating device (2) and the transport system.

16. The conveyor system according to claim 1 wherein the first conveyor track and the second conveyor track include sliding pieces disposed along a row for forming a sliding contact rail;
a proximity switch coordinated to an individually possible stop position of the first conveyor track.

17. The conveyor system according to claim 1 further comprising
wherein two sliding contact rails are present in the neighborhood of the load auxiliary means for the first conveyor track and for the second conveyor track and wherein the engagement dogs are disposed next to the respective sliding contact rail for moving in a direction substantially parallel to the sliding contact rail;
a second shaft wherein the deflection pulley is disposed on the second shaft and at the start of the conveyor track ahead of the edge of the load auxiliary means by a distance corresponding to the extension of the engagement dog perpendicular to hinges of the drive chain and to the length of the backplate and wherein the deflection pulley is disposed at the end of the conveyor track by the circular arc measure of the engagement dog around the rotation axis of the shaft up to the lower edge of the load auxiliary means ahead of the end deflection place.

18. The conveyor system according to claim 1 further comprising
guide rails disposed next to the outer sliding contact rails of the conveyor system;
a light barrier disposed between a lift table of rack-operating device and the conveyor transport system.

19. The conveyor system according to claim 1 wherein the first conveyor track and the second conveyor track include sliding pieces disposed along a row for forming a sliding contact rail;
a frame part;
a bearing block supported on the frame;
a bearing attached to the bearing block;
a shaft, wherein the drive wheel is attached to the shaft and wherein the shaft is supported via the bearing; a drive chain connecting the drive wheel to the motor;
a light barrier disposed between a lift table of rack-operating device and the conveyor transport system.

20. The conveyor system according to claim 2 further comprising
guide rails disposed next to the outer sliding contact rails of the conveyor system.

21. The conveyor system according to claim 5 wherein the first conveyor track and the second conveyor track include sliding pieces disposed along a row for forming a sliding contact rail.

22. The conveyor system according to claim 2 further comprising
a light barrier disposed between a lift table of
a rack-operating device and the conveyor transport system.

23. The conveyor system according to claim 2 further comprising
a second shaft wherein the deflection pulley is disposed on the second shaft and at the start of the conveyor track ahead of the edge of the load auxiliary means by a distance corresponding to the extension of the engagement dog perpendicular to hinges of the drive chain and to the length of the backplate and wherein the deflection pulley is disposed at the end of the conveyor track by the circular arc measure of the engagement dog around the rotation axis of the shaft up to the lower edge of the load auxiliary means ahead of the end deflection place.

24. The conveyor system according to claim 4 further comprising
a proximity switch coordinated to an individually possible stop position of the first conveyor track.

* * * * *